United States Patent
Sugawara et al.

(10) Patent No.: US 9,911,955 B2
(45) Date of Patent: Mar. 6, 2018

(54) METHOD FOR PRODUCING POROUS POLYIMIDE FILM, POROUS POLYIMIDE FILM AND SEPARATOR USING SAME

(71) Applicant: Tokyo Ohka Kogyo Co., Ltd., Kanagawa (JP)

(72) Inventors: Tsukasa Sugawara, Kanagawa (JP); Takahiro Asai, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 15/334,767

(22) Filed: Oct. 26, 2016

(65) Prior Publication Data

US 2017/0187021 A1    Jun. 29, 2017

Related U.S. Application Data

(62) Division of application No. 14/785,391, filed as application No. PCT/JP2014/059513 on Mar. 31, 2014, now Pat. No. 9,601,739.

(30) Foreign Application Priority Data

Apr. 22, 2013  (JP) ................. 2013-089813

(51) Int. Cl.
| | | |
|---|---|---|
| B01D 67/00 | (2006.01) |
| B01D 71/64 | (2006.01) |
| H01M 2/14 | (2006.01) |
| H01M 10/0525 | (2010.01) |
| H01M 2/16 | (2006.01) |

(52) U.S. Cl.
CPC .......... H01M 2/145 (2013.01); H01M 2/166 (2013.01); H01M 2/1686 (2013.01); H01M 10/0525 (2013.01)

(58) Field of Classification Search
CPC .... B01D 67/003; B01D 71/64; B01D 46/006; B01D 2323/12; B01D 2323/18; B32B 27/34; B32B 27/281
See application file for complete search history.

(56) References Cited

U.S. PATENT DOCUMENTS

| | | |
|---|---|---|
| 2007/0224516 A1 | 9/2007 | Deguchi et al. |
| 2008/0070107 A1 | 3/2008 | Kasamatsu |
| 2015/0072219 A1 | 3/2015 | Less et al. |

FOREIGN PATENT DOCUMENTS

| | | |
|---|---|---|
| CN | 102582138 | 7/2012 |
| EP | 3 029 093 | 6/2016 |
| EP | 3 113 246 | 1/2017 |
| JP | 2007-092078 | 4/2007 |
| JP | 2007-92078 | 4/2007 |
| JP | 2007092078 A * | 4/2007 |
| JP | 2008-204928 | 9/2008 |
| JP | 2008-272636 | 11/2008 |
| JP | 2010-195898 | 9/2010 |
| JP | 2010-537387 | 12/2010 |
| JP | 2011-60539 | 3/2011 |
| JP | 2011-060539 | 3/2011 |
| JP | 2011060539 A * | 3/2011 |
| JP | 2011-111470 | 6/2011 |
| JP | 2011111470 A * | 6/2011 |
| JP | 2012-107144 | 6/2012 |
| JP | 2013-109843 | 6/2013 |
| WO | 2011/090356 | 7/2011 |

OTHER PUBLICATIONS

Office Action dated May 26, 2017 in corresponding European Application No. 14787967.0.
Abraham, "Directions in Secondary Lithium Battery Research and Development", Electrochimica Acta, 38(9):1233 -1248 (1993).
International Search Report dated Jul. 1, 2014 in corresponding International Application No. PCT/JP2014/059513 (with English translation).
Kazuhei Miyahara, et al., "Evaluation of Fundamental Properties of 3DOM PI Separator and its Application to Lithium Secondary Batteries," 3D21, p. 267 (2012).
Extended European Search Report dated Mar. 23, 2016 in European patent application No. 14 78 7967.
Definition of "Burning", Dictionary.com. 2016.
Office Action dated Jan. 4, 2018 in corresponding European Application No. 14787967.0.

* cited by examiner

*Primary Examiner* — Kara Boyle
(74) *Attorney, Agent, or Firm* — Wenderoth, Lind & Ponack, L.L.P.

(57) ABSTRACT

A method for producing a porous polyimide film comprises: forming a first un-burned composite film wherein the first film is formed on a substrate using a first varnish that contains (A1) a polyamide acid or a polyimide and (B1) fine particles at a volume ratio (A1):(B1) of from 19:81 to 45:65; forming a second un-burned composite film wherein the second film is formed on the first film using a second varnish that contains (A2) a polyamide acid or a polyimide and (B2) fine particles at a volume ratio (A2):(B2) of from 20:80 to 50:50 and has a lower fine particle content ratio than the first varnish; burning wherein an un-burned composite film composed of the first film and the second film is burned, thereby obtaining a polyimide-fine particle composite film; and a fine particle removal step wherein the fine particles are removed from the polyimide-fine particle composite film.

2 Claims, 2 Drawing Sheets

METHOD FOR PRODUCING POROUS POLYIMIDE FILM, POROUS POLYIMIDE FILM AND SEPARATOR USING SAME

TECHNICAL FIELD

The present invention relates to a method for producing a porous polyimide film, a porous polyimide film, and a separator including the film.

BACKGROUND ART

In recent years, because of reductions in sizes of portable electronic devices and development of hybrid automobiles, electric automobiles, etc. due to consideration of environmental problems such as increases in atmospheric pollution and carbon dioxide, secondary batteries having excellent characteristics, such as high efficiency, high output, high energy density, and light weight are needed for such electronic devices and electric automobiles. Various secondary batteries having such characteristics have been developed and researched. Lithium secondary batteries have been also variously researched in order to provide ones having such characteristics.

A chargeable and dischargeable lithium battery usually has a structure in which a space between a positive electrode (cathode) and a negative electrode (anode) is filled with a lithium salt, such as $LiPF_6$, dissolved in an electrolytic solution, for example, a non-aqueous organic solvent. Lithium transition metal oxide is used as the positive electrode, and lithium or carbon (graphite) is mainly used as the negative electrode. The electrolytic solution has a good ionic conductivity and a negligible electrical conductivity. During charging, lithium ions move from the positive electrode to the negative electrode, and during discharging, lithium ions move in the reverse direction.

The positive electrode and the negative electrode of the lithium battery are separated from each other with a separator of a porous polymer film and are formed into a structure preventing their direct electric contact. Accordingly, the separator for a secondary battery is required to have various characteristics, such as film thickness (thinness), mechanical strength, ionic conductance (during containing of an electrolytic solution), electric insulation, electrolytic solution resistance, electrolytic solution-retaining property, and wettability. As the separators for secondary batteries having these properties, fine porous films made of polyolefins, such as polyethylene and polypropylene, are generally used. These fine porous films have random pores at a porosity of about 35% to 40% and are widely used as separators for lithium secondary batteries having negative electrodes of carbon.

However, these conventionally known separators are known to deposit lithium metal on graphite negative electrodes due to repeated charge and discharge cycles. Furthermore, the repetition of charge and discharge of a battery is known to cause the growth of dendrite lithium, resulting in a short circuit of the battery and this problem needs to be solved (Patent Document 1). In contrast, providing uniform pores in a separator in a regular manner is known to have an effect of improving the electrical characteristics of a battery (Non-Patent Document 1).

Separately, it has been tried to use a polyimide having a high heat-resistance and high safety in the separator (Patent Documents 2 and 3). However, the pores formed in the conventional polyimide film have insufficient uniformity and density.

Patent Document 1: Japanese Unexamined Patent Application (Translation of PCT Application), Publication No. 2010-537387
Patent Document 2: Japanese Unexamined Patent Application, Publication No. 2011-111470
Patent Document 3: Japanese Unexamined Patent Application, Publication No. 2012-107144
Non-Patent Document 1: Kazuhei Miyahara, and three others, "Evaluation of fundamental properties of 3DOM PI separator and production of metal lithium secondary battery", The 53rd Battery Symposium in Japan, proceedings, 3D21, p. 267 (2012)

DISCLOSURE OF THE INVENTION

Problems to be Solved by the Invention

The present invention has been made in view of the above circumstances, and an object thereof is to provide a method for producing a porous polyimide film having uniform and dense pores on the surface in contact with a surface of the negative electrode of a lithium-ion battery.

Means for Solving the Problems

The present inventors have found that a porous polyimide film having uniform and dense pores can be produced by forming two different layers composed of fine particles and a polyamide acid or polyimide on a substrate such that a layer on the substrate side contains a larger amount of the fine particles and that the battery performance can be improved by disposing the film such that the surface having uniform and dense pores faces the negative electrode of lithium-ion battery, and have arrived at the present invention.

A first aspect of the present invention relates to a method for producing a porous polyimide film, the method comprising: a first unburned composite film-forming step of forming a first unburned composite film of a first varnish on a substrate, the first varnish containing a polyamide acid or polyimide (A1) and fine particles (B1) at a volume ratio (A1):(B1) of 19:81 to 45:65; a second unburned composite film-forming step of forming a second unburned composite film of a second varnish on the first unburned composite film, the second varnish containing a polyamide acid or polyimide (A2) and fine particles (B2) at a volume ratio (A2):(B2) of 20:80 to 50:50 and having a fine particle content ratio lower than that of the first varnish; a burning step of burning an unburned composite film composed of the first unburned composite film and the second unburned composite film to prepare a polyimide-fine particle composite film; and a fine particle-removing step of removing the fine particles from the polyimide-fine particle composite film.

A second aspect of the present invention relates to a porous polyimide film produced by the method according to the first aspect of the present invention.

A third aspect of the present invention relates to a separator composed of the porous polyimide film according to the second aspect of the present invention.

A fourth aspect of the present invention relates to a secondary battery including an electrolytic solution and the separator according to the third aspect disposed between a negative electrode and a positive electrode, wherein the surface of the separator disposed on the substrate side in the burning step of the first aspect is arranged on the negative electrode side.

A fifth aspect of the present invention relates to a method for producing an unburned composite film, the method comprising: a first unburned composite film-forming step of forming a first unburned composite film of a first varnish on a substrate, the first varnish containing a polyamide acid or polyimide (A1) and fine particles (B1) at a volume ratio (A1):(B1) of 19:81 to 45:65; and a second unburned composite film-forming step of forming a second unburned composite film of a second varnish on the first unburned composite film, the second varnish containing a polyamide acid or polyimide (A2) and fine particles (B2) at a volume ratio (A2):(B2) of 20:80 to 50:50 and having a fine particle content ratio lower than that of the first varnish.

A sixth aspect of the present invention relates to a method for producing a polyimide-fine particle composite film, the method comprising a burning step of burning the unburned composite film produced by the method according to the fourth aspect of the present invention.

Effects of the Invention

According to the present invention, it is possible to produce a porous polyimide film having a large number of uniform and dense pores on its surface in contact with a surface of the negative electrode of a lithium-ion battery. Use of this film as the separator of a battery allows easy movement of lithium ions and can thereby improve the electrical characteristics of the battery.

PREFERRED MODE FOR CARRYING OUT THE INVENTION

Figure 1:
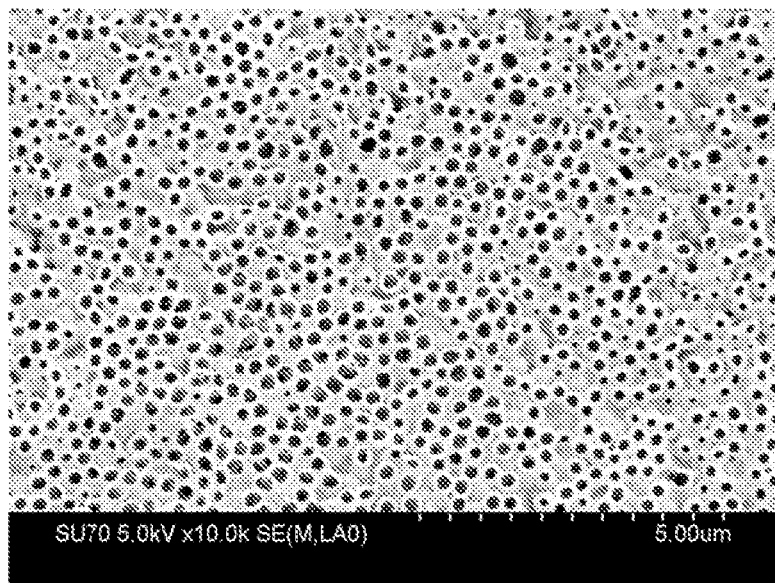
FIG. 1 is a photograph showing a surface of a porous polyimide film produced using a varnish containing fine particles at a volume fraction of 85%.

Embodiments of the present invention will now be described in detail, but the present invention is not limited to the following embodiments and can be implemented with appropriate modifications within the purpose of the present invention.

Preparation of Varnish

In the present invention, two types of varnishes each containing a polyamide acid or polyimide, fine particles, and an organic solvent are prepared. Both varnishes are prepared through production of a polyamide acid or polyimide solution in which prescribed fine particles are dispersed.

The two types of varnishes are a first varnish containing a polyamide acid or polyimide (A1) and fine particles (B1) at a volume ratio (A1):(B1) of 19:81 to 45:65 and a second varnish containing a polyamide acid or polyimide (A2) and fine particles (B2) at a volume ratio (A2):(B2) of 20:80 to 50:50. In this regard, the second varnish should have a fine particle content ratio lower than that of the first varnish.

The varnishes are each prepared by mixing an organic solvent in which prescribed fine particles are dispersed in advance with a polyamide acid or polyimide at an appropriate ratio or by polymerizing a polyamide acid or polyimide in an organic solvent in which prescribed fine particles are dispersed in advance. The fine particles may be any particles that are insoluble in the organic solvent to be used in the varnishes and can be selectively removed after film formation.

In the present invention, the volume ratio between (A1) and (B1) in the first varnish is the ratio between the volume determined by multiplying the mass of the polyamide acid or polyimide (A1) by its specific gravity and the volume of the fine particles (B1). The volume ratio between (A2) and (B2) in the second varnish is also determined as in above.

[Polyamide Acid]

The polyamide acid used in the present invention may be any one prepared by polymerizing appropriate tetracarboxylic dianhydride and diamine. The amounts of the tetracarboxylic dianhydride and the diamine are not particularly limited, and the amount of the diamine is preferably 0.50 to 1.50 mol, more preferably 0.60 to 1.30 mol, and most preferably 0.70 to 1.20 mol, based on 1 mol of the tetracarboxylic dianhydride.

The tetracarboxylic dianhydride can be appropriately selected from tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. The tetracarboxylic dianhydrides may be used in a combination of two or more thereof.

Preferred examples of the aromatic tetracarboxylic dianhydride include pyromellitic dianhydride, 1,1-bis(2,3-dicarboxyphenyl)ethane dianhydride, bis(2,3-dicarboxyphenyl) methane dianhydride, bis(3,4-dicarboxyphenyl)methane dianhydride, 3,3',4,4'-biphenyltetracarboxylic dianhydride, 2,3,3',4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, bis(3,4-dicarboxyphenyl)ether dianhydride, bis(2,3-dicarboxyphenyl)ether dianhydride, 2,2',3,3'-benzophenonetetracarboxylic dianhydride, 4,4-(p-phenylenedioxy) diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3, 6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bisphthalic anhydride fluorene, and 3,3',4,4'-diphenylsulfonetetracarboxylic dianhydride. Examples of the aliphatic tetracarboxylic dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, and 1,2,3,4-cyclohexanetetracarboxylic dianhydride. Among these tetracarboxylic dianhydrides, 3,3',4,4'-biphenyltetracarboxylic dianhydride and pyromellitic dianhydride are preferred because of their inexpensiveness and ready availability. These tetracarboxylic dianhydrides may be used alone or as a mixture of two or more thereof.

The diamine can be appropriately selected from diamines that have been conventionally used as raw materials for synthesizing polyamide acids. The diamine may be an aromatic diamine or an aliphatic diamine, but from the viewpoint of the heat resistance of the resulting polyimide resin, an aromatic diamine is preferred. These diamines may be used in a combination of two or more thereof.

Examples of the aromatic diamine include diamino compounds having one phenyl group or about two to ten phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The phenylenediamines are, for example, m-phenylenediamine and p-phenylenediamine. The phenylenediamine derivatives are diamines to which alkyl groups, such as a methyl group or an ethyl group, are bound, such as 2,4-diaminotoluene and 2,4-triphenylenediamine.

The diaminodiphenyl compounds are obtained by linkage of two aminophenyl groups at their phenyl groups. For example, the diaminodiphenyl compounds are 4,4'-diaminobiphenyl and 4,4'-diamino-2,2'-bis(trifluoromethyl)biphenyl.

Alternatively, the diaminodiphenyl compounds are obtained by linkage of two aminophenyl groups at their phenyl groups via another group. The linkage is, for example, an ether linkage, a sulfonyl linkage, a thioether linkage, a linkage of an alkylene or its derivative group, an imino linkage, an azo linkage, a phosphine oxide linkage, an amide linkage, or an ureylene linkage. The alkylene linkage is a linkage of an alkylene having about 1 to 6 carbon atoms, and its derivative group is an alkylene group whose one or more hydrogen atoms have been replaced by, for example, halogen atoms.

Examples of the diaminodiphenyl compounds include 3,3'-diaminodiphenyl ether, 3,4'-diaminodiphenyl ether, 4,4'-diaminodiphenyl ether, 3,3'-diaminodiphenyl sulfone, 3,4'-diaminodiphenyl sulfone, 4,4'-diaminodiphenyl sulfone, 3,3'-diaminodiphenyl methane, 3,4'-diaminodiphenyl methane, 4,4'-diaminodiphenyl methane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diaminodiphenylurea, 4,4'-diaminodiphenylamide, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl] sulfone, bis[4-(3-aminophenoxy)phenyl]sulfone, 2,2-bis[4-(4-aminophenoxy)phenyl] propane, and 2,2-bis[4-(4-aminophenoxy)phenyl]hexafluoropropane.

Among these, p-phenylenediamine, m-phenylenediamine, 2,4-diaminotoluene, and 4,4'-diaminodiphenylether are preferred because of their inexpensiveness and ready availability.

The diaminotriphenyl compound is formed by linkage of two aminophenyl groups and one phenylene group, all of which are each linked through another group. The "another group" is selected from the same groups as in the diaminodiphenyl compounds. Examples of the diaminotriphenyl compounds include 1,3-bis(m-aminophenoxy)benzene, 1,3-bis(p-aminophenoxy)benzene, and 1,4-bis(p-aminophenoxy)benzene.

Examples of the diaminonaphthalenes include 1,5-diaminonaphthalene and 2,6-diaminonaphthalene.

Examples of the aminophenylaminoindanes include 5- or 6-amino-1-(p-aminophenyl)-1,3,3-trimethylindane.

Examples of the diaminotetraphenyl compounds include 4,4'-bis(p-aminophenoxy)biphenyl, 2,2'-bis[p-(p'-aminophenoxy)phenyl]propane, 2,2'-bis[p-(p'-aminophenoxy)biphenyl]propane, and 2,2'-bis[p-(m-aminophenoxy)phenyl]benzophenone.

An example of the cardo-type fluorenediamine derivatives is 9,9-bisanilinefluorene.

The aliphatic diamine has, for example, about 2 to 15 carbon atoms, and specifically, examples thereof include pentamethylenediamine, hexamethylenediamine, and heptamethylenediamine.

The aliphatic diamine may be a compound having at least one substituent selected from the group consisting of halogen atoms and methyl, methoxy, cyano, and phenyl groups for hydrogen atoms of the diamine.

The polyamide acid to be used in the present invention may be produced by any method and, for example, can be produced by a known method, for example, by reacting an acid and a diamine component in an organic solvent.

The reaction of a tetracarboxylic dianhydride and a diamine is usually performed in an organic solvent. The organic solvent to be used for the reaction of a tetracarboxylic dianhydride and a diamine may be any organic solvent that can dissolve the tetracarboxylic dianhydride and the diamine without reacting with the tetracarboxylic dianhydride and the diamine. The organic solvent may be a single solvent or a mixture of two or more solvents.

Examples of the organic solvent to be used for the reaction of a tetracarboxylic dianhydride and a diamine include nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valerolactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols. These organic solvents may be used alone or as a mixture of two or more thereof. The amount of the organic solvent is not particularly limited but is desirably such that the content of the resulting polyamide acid is 5% to 50% by mass.

Among these organic solvents, from the viewpoint of the solubility of the resulting polyamide acid, preferred are nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea.

The polymerization temperature is usually −10° C. to 120° C. and preferably 5° C. to 30° C. The polymerization time varies depending on the raw material composition and is usually 3 to 24 hours (hr). The organic solvent solution of the polyamide acid prepared under such conditions preferably has an intrinsic viscosity of 1000 to 100000 centipoises (cP), more preferably in a range of 5000 to 70000 cP.

Polyimide

The polyimide used in the present invention can be any known polyimide, without restricted by its structure and molecular weight, as long as the polyimide is soluble in the organic solvent to be used in the varnish of the present invention. The side chain of the polyimide may have a condensable functional group, such as a carboxy group, or a functional group enhancing the cross-linking reaction during burning.

In order to make the polyimide soluble in an organic solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in an organic solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility.

The polyimide soluble in an organic solvent to be used in the present invention may be produced by any method and, for example, can be produced by a known method of, for example, chemically imidizing or thermally imidizing a polyamide acid and dissolving the imidized polyamide in an organic solvent. Examples of such polyimides include aliphatic polyimide (full-aliphatic polyimides) and aromatic polyimides, and aromatic polyimides are preferred. The aromatic polyimide may be one prepared by a thermal or chemical ring-closing reaction of a polyamide acid having repeating units represented by Formula (1) or one prepared by dissolving a polyimide having repeating units represented by Formula (2) in a solvent. In the formulae, Ar represents an aryl group.

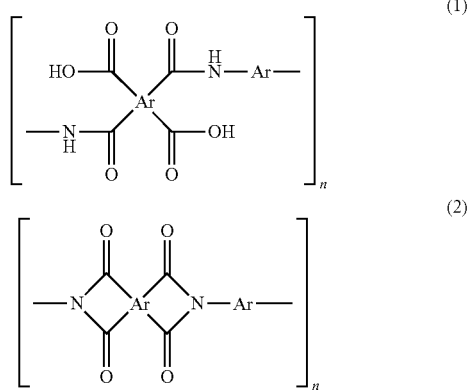

The varnish of the present invention can be produced by mixing a polyamide acid or polyimide with an organic solvent in which fine particles are dispersed in advance at an appropriate ratio, or by polymerizing a tetracarboxylic dianhydride and a diamine into a polyamide acid in an organic solvent in which fine particles are dispersed in advance, or by further performing imidization into a polyimide. The final viscosity thereof is preferably adjusted to 300 to 1500 cP and more preferably in a range of 400 to 700 cP. The varnish having a viscosity within this range can be formed into a uniform film.

When fine particles and a polyamide acid or polyimide are burned into a polyimide-fine particle composite film and when the material of the fine particles is an inorganic material described below, the varnish may contain the fine particles and the polyamide acid or polyimide such that the ratio of the fine particles to the polyimide is 2 to 6 (mass ratio). The ratio is more preferably 3 to 5 (mass ratio). When the material of the fine particles is an organic material described below, the fine particles and the polyamide acid or polyimide may be mixed such that the ratio of the fine particles to the polyimide is 1 to 3.5 (mass ratio). The ratio is more preferably 1.2 to 3 (mass ratio). Alternatively, the fine particles and the polyamide acid or polyimide may be mixed so as to provide a polyimide-fine particle composite film having a volume ratio of the fine particles to the polyimide of 1.5 to 4.5. The ratio is more preferably 1.8 to 3 (volume ratio). When a mass ratio or volume ratio of the fine particles to the polyimide is not lower than the lower limit in a polyimide-fine particle composite film, the film can have pores at an appropriate density as a separator. When the mass ratio or volume ratio is not higher than the upper limit, a film can be stably formed without causing problems such as an increase in viscosity or cracking in the film.

Fine Particles

The material of the fine particles used in the present invention is not particularly limited and may be any known material as long as the material is insoluble in the organic solvent used in the varnish and can be removed later from the polyimide film. Examples of the inorganic material include metal oxides, such as silica (silicon dioxide), titanium oxide, and alumina ($Al_2O_3$). Examples of the organic materials include high-molecular-weight olefins (such as polypropylene and polyethylene) and organic polymer fine particles, such as polystyrenes, epoxy resins, celluloses, polyvinyl alcohols, polyvinyl butyrals, polyesters, and polyethers.

Specifically, the fine particles are preferably, for example, colloidal silica, in particular, monodisperse spherical silica particles which can form uniform pores.

The fine particles to be used in the present invention preferably have a high sphericity and a low particle diameter distribution index. Fine particles satisfying these requirements show excellent dispersibility in the varnish and can be used without causing aggregation with one another. As the fine particles, those having a particle diameter (average diameter) of, for example, 100 to 2000 nm can be used. The fine particles satisfying these requirements can provide pores having uniform pore diameters to the porous film by removing the fine particles and can homogenize the electric field to be applied to the separator.

The fine particles (B1) in the first varnish and the fine particles (B2) in the second varnish may be the same or different. In order to increase the density of the pores on the side in contact with the substrate to be higher than that on the other side, the fine particles (B1) preferably have a particle diameter distribution index lower than or equal to that of the fine particles (B2). Alternatively, the fine particles (B1) preferably have a sphericity lower than or equal to that of the fine particles (B2). In addition, the particle diameter (average diameter) of the fine particles (B1) is preferably smaller than that of the fine particles (B2). In particular, the fine particles (B1) preferably have a particle diameter of 100 to 1000 nm (more preferably 100 to 600 nm), and the fine particles (B2) preferably have a particle diameter of 500 to 2000 nm (more preferably 700 to 2000 nm). The use of the fine particles (B1) having a particle diameter smaller than that of the fine particles (B2) can give pores at a high aperture proportion with a small variation in the aperture proportion on the surface of the polyimide film and can increase the strength of the film compared to the case of using fine particles having the same particle diameter as that of the fine particles (B1) in the entire polyimide film.

The first varnish to be used in the present invention has a volume ratio between the polyamide acid or polyimide (A1) and the fine particles (B1) of 19:81 to 45:65. When the volume of the fine particles is 65 or more based on 100 of the total volume of the first varnish, the particles are uniformly dispersed, and when the volume is 81 or less, the particles are dispersed without causing aggregation with one another to allow uniform formation of pores on the surface of the polyimide film on the substrate side. When the volume ratio of the fine particles is within this range, mold releasability after formation of a film can be secured even if the substrate to be used for forming an unburned composite film is not provided with a mold release layer in advance.

The second varnish to be used in the present invention has a volume ratio between the polyamide acid or polyimide (A2) and the fine particles (B2) of 20:80 to 50:50. When the volume of the fine particles is 50 or more based on 100 of the total volume of the second varnish, the particles are uniformly dispersed without aggregating, and when the volume is 80 or less, the particles are not aggregated and do not cause cracking on the surface, resulting in stable formation of a porous polyimide film having good electrical characteristics.

In the present invention, the content ratio of the fine particles in the second varnish is lower than that in the first varnish. By satisfying this requirement, even if the polyamide acid or polyimide contains a large amount of the fine particles, the strength and flexibility of the unburned composite film, polyimide-fine particle composite film, and porous polyimide film can be secured. In addition, the lower content ratio of the fine particles in the layer can reduce the cost of producing the film.

In the present invention, the varnish may further contain a dispersant in addition to the fine particles, in order to uniformly disperse the fine particles in the varnish. The addition of the dispersant allows further uniform mixing of the polyamide acid or polyimide with the fine particles and further uniform dispersion of the fine particles in the molded or formed precursor film. As a result, dense apertures are provided on the surface of the finally formed porous polyimide film, and the front and rear surfaces can be efficiently communicated with each other to improve the air permeability of the film.

The dispersant used in the present invention is not particularly limited and may be any known one. Examples of the dispersant include, but not limited to, anionic surfactants, such as salts of coconut fatty acid, salts of sulfonated castor oil, lauryl sulfate, polyoxyalkylene allylphenyl ether sulfate, alkylbenzenesulfonic acid, alkylbenzene sulfonate, alkyldiphenyl ether disulfonate, alkylnaphthalene sulfonate, dialkyl sulfosuccinate, isopropyl phosphate, polyoxyethylene alkyl ether phosphate, and polyoxyethylene allylphenyl ether phosphate; cationic surfactants, such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants, such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants, such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants, such as polyoxyethylene dilaurate, polyoxyethylene laurate, polyoxyethylenated castor oil, polyoxyethylenated hydrogenated castor oil, sorbitan laurate, polyoxyethylene sorbitan laurate, and fatty acid diethanolamide; fatty acid alkyl esters, such as octyl stearate and trimethylolpropane tridecanoate; and polyether polyols, such as polyoxyalkylene butyl ether, polyoxyalkylene oleyl ether, and trimethylol propane tris(polyoxyalkylene) ether. These dispersants may be used as a mixture of two or more thereof.

[Production of Unburned Composite Film]

A method for forming an unburned composite film in the present invention will now be described. The first varnish is applied onto a substrate, such as a glass substrate, directly or with a mold release layer provided in advance and is then dried under ordinary pressure or vacuum at 0° C. to 50° C., preferably under ordinary pressure at 10° C. to 30° C., to form a first unburned composite film. The step thus far is referred to as the first unburned composite film-forming step.

Subsequently, the second varnish is applied onto the first unburned composite film thus formed, and is similarly dried under ordinary pressure or vacuum at 0° C. to 50° C., preferably under ordinary pressure at 10° C. to 30° C. This step is referred to as the second unburned composite film-forming step.

Subsequently, a burning step for forming a polyimide-fine particle composite film by burning the unburned composite films, the first unburned composite film and the second unburned composite film, takes place. The unburned composite films may be burned while being formed on the substrate or may be peeled from the substrate prior to the burning step.

In a case of peeling the unburned composite film from the substrate, the substrate provided with a mold release layer in advance can also be used in order to further enhance the detachability of the film. In a case of providing a mold release layer in the substrate in advance, the mold release agent is applied onto the substrate and is dried or baked before the application of the varnish. The mold release agent used here may be a known mold release agent, such as an alkylphosphate ammonium salt-based or fluorine-based agent or silicon, without particular restriction. When the dried unburned composite film is peeled from the substrate, a slight amount of the mold release agent remains on the surface of the peeled unburned composite film and may lead to discoloration during burning and adverse effects to the electrical characteristics, and the mold release agent should therefore be removed as much as possible.

Accordingly, in order to remove the mold release agent, the unburned composite film peeled from the substrate is preferably washed with an organic solvent. Any organic solvent that can dissolve the mold release agent without dissolving or swelling the unburned composite film can be used without particular restriction. For example, alcohols, such as methyl alcohol, ethyl alcohol, and propyl alcohol, can be preferably used. The washing method can be selected from known methods, such as a method in which a film is immersed in a washing solution and is then taken out or a method of shower washing. After washing, drying is preferably performed. Here, a method of fixing ends of the unburned composite film to a frame or the like made of stainless steel to thereby prevent deformation can be employed.

Alternatively, when a substrate is directly used without being provided with a mold release layer in formation of the unburned composite film, the steps of forming the mold release layer and washing the unburned composite film can be omitted.

[Production of Polyimide-Fine Particle Composite Film (Burning Step)]

The unburned composite film was heated as post-treatment (burning) into a composite film (polyimide-fine particle composite film) composed of a polyimide and fine particles. The burning temperature varies depending on the structure of the unburned composite film and the presence or absence of a condensing agent and is preferably 120° C. to 375° C. and more preferably 150° C. to 350° C. In a case of using an organic material for the fine particles, the burning temperature must be set to a temperature lower than the thermal decomposition temperature of the organic material. In the burning step, imidization is preferably completed.

The burning may be performed by, for example, a method of increasing the temperature from room temperature to 375° C. over 3 hours and then holding 375° C. for 20 minutes or a method of stepwise drying-thermal imidization by stepwise increasing the temperature by 50° C. from room temperature to 375° C. (holding the temperature of each step for 20 minutes) and finally holding 375° C. for 20 minutes. When the unburned composite film is peeled from the substrate once, an end of the unburned composite film may be fixed to, for example, a frame made of SUS stainless steel to prevent deformation.

The thickness of the resulting polyimide-fine particle composite film can be determined by, for example, measuring the thicknesses of a plurality of positions with a micrometer or the like and averaging the thicknesses. Preferred average film thickness varies depending on the purpose of the polyimide-fine particle composite film or the porous polyimide film, however, is preferably 5 to 500 μm and more preferably 10 to 100 μm, in the use as a separator for example.

[Porosification of Polyimide-Fine Particle Composite Film (Fine Particle-Removing Step)]

The porous polyimide film can be produced with high reproducibility by selecting an appropriate method for removing the fine particles from the polyimide-fine particle composite film.

For example, when silica is employed as the material of the fine particles, the silica can be removed by treating the polyimide-fine particle composite film with, for example, a low-concentration hydrogen fluoride solution to dissolve the silica.

Alternatively, an organic material may also selected as the material of the fine particles. Any organic material, which is decomposed at a temperature lower than polyimide, may be used. Examples of the fine particles include resin particulates composed of linear polymers and known depolymerizable polymers. The linear polymer usually has a molecular chain that is randomly cleaved during thermal decomposition; and the depolymerizable polymer is decomposed into a monomer during thermal decomposition. Both of them are decomposed into a low molecular weight substance or to $CO_2$ and disappear from the polyimide film. The resin fine particles to be used preferably have a decomposition temperature of 200° C. to 320° C. and more preferably 230° C. to 260° C. A decomposition temperature of 200° C. or more allows formation of a film even if the varnish contains a high boiling point solvent and broadens the selection of burning conditions of the polyimide. In addition, a decomposition temperature of lower than 320° C. allows the resin fine particles to disappear without thermally damaging the polyimide.

The total thickness of the porous polyimide film of the present invention is not particularly limited and is preferably 5 μm or more and 500 μm or less, more preferably 10 μm or more and 100 μm or less, and most preferably 10 μm or more and 30 μm or less. The above-mentioned thickness can be determined by, for example, measuring the thicknesses of a plurality of positions with a micrometer or the like and averaging the thicknesses, as in the polyimide-fine particle composite film.

The layer formed from the first varnish preferably has a thickness of 0.3 μm or more and 5 μm or less, preferably 0.4 μm or more and 4 μm or less, and more preferably 0.5 μm or more and 3 μm or less; and the layer formed from the first varnish preferably has a thickness of 4.3 μm or more and 500 μm or less, preferably 4.5 μm or more and 99.7 μm or less, and more preferably 5 μm or more and 29.7 μm or less. The thickness of each laminar region can be calculated by averaging thicknesses at a plurality of positions in the first and second laminar regions of a cross section of a porous film observed with, for example, a scanning electron microscope (SEM).

[Use of Porous Polyimide Film]

The porous polyimide film produced by the method of the present invention can be used as the separator of a lithium-ion battery, a fuel cell electrolyte film, a film for separating a gas or liquid, or a low dielectric constant material. The porous polyimide film of the present invention can be used as the separator for a secondary battery, such as a nickel cadmium or nickel hydrogen battery or a lithium ion secondary battery and is particularly preferably used as the porous separator for a lithium ion secondary battery. In particular, when the film is used as the separator for a lithium-ion battery, the battery performance can be improved by arranging the surface on the substrate side during the formation of the film on the negative electrode side of the lithium-ion battery.

[Secondary Battery]

The secondary battery in the present invention is characterized in that an electrolytic solution and the separator according to the third aspect are arranged between the negative electrode and the positive electrode and that the surface of the separator arranged on the substrate side in the burning step of the first aspect is arranged on the negative electrode side.

The secondary battery of the present invention may be of any type and may have any configuration. The secondary battery is not particularly limited to known secondary batteries such as nickel cadmium and nickel hydrogen batteries as well as a lithium ion secondary battery, as long as the battery has a configuration in which battery elements, a positive electrode, a separator, and a negative electrode laminated in this order so as to satisfy the above-described requirements, are impregnated with an electrolytic solution and are encapsulated in an outer package.

The negative electrode of the secondary battery of the present invention can have a structure in which a negative electrode mixture composed of a negative electrode active material, a conductive auxiliary agent, and a binder is formed on a collector. For example, as the negative electrode active material, cadmium hydroxide can be used in nickel cadmium batteries, and a hydrogen-occlusion alloy can be used in nickel hydrogen batteries. In lithium ion secondary batteries, a material that can be electrochemically doped with lithium can be employed. Examples of such active materials include carbon materials, silicon, aluminum, tin, and Wood's alloy.

Examples of the conductive auxiliary agent constituting the negative electrode include carbon materials such as acetylene black and Ketjen black. The binder is composed of an organic polymer, and examples thereof include polyvinylidene fluoride and carboxymethyl cellulose. The collector can be, for example, copper foil, stainless steel foil, or nickel foil.

The positive electrode can have a structure in which a positive electrode mixture composed of a positive electrode active material, a conductive auxiliary agent, and a binder is formed on a collector. For example, the positive electrode active material can be nickel hydroxide in nickel cadmium batteries and can be nickel hydroxide or nickel oxyhydroxide in nickel hydrogen batteries. Meanwhile, in lithium ion secondary batteries, examples of the positive electrode active material include lithium-containing transition metal oxides, specifically, $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$, and $LiAl_{0.25}Ni_{0.75}O_2$. Examples of the conductive auxiliary agent include carbon materials such as acetylene black and Ketjen black. The binder is an organic polymer, and examples thereof include polyvinylidene fluoride. The collector can be, for example, aluminum foil, stainless steel foil, or titanium foil.

The electrolytic solution in, for example, a nickel cadmium battery or a nickel hydrogen battery is a potassium hydroxide solution. The electrolytic solution in a lithium ion secondary battery is composed by dissolving a lithium salt in a non-aqueous solvent. Examples of the lithium salt include $LiPF_6$, $LiBF_4$, and $LiClO_4$. Examples of the non-aqueous solvent include propylene carbonate, ethylene carbonate, dimethyl carbonate, diethyl carbonate, ethyl methyl carbonate, γ-butyrolactone, and vinylene carbonate. These solvents may be used alone or as a mixture.

Examples of the outer package material include metal cans and aluminum laminate packs. The shape of the battery is, for example, a rectangular shape, a cylindrical shape, or a coin shape; however, the separator of the present invention can be suitably applied to any shape.

The pores on the separator facing the negative electrode side of the battery preferably have small diameters without variation in size and are preferably arranged densely to prevent charge concentration. Accordingly, when the surface of the porous polyimide film having been arranged on the substrate side during the burning step is arranged on the negative electrode side of a secondary battery, the dendrite growth of the metal from the negative electrode side due to repeated use of the secondary battery can be suppressed compared to other cases. This is preferable since the cycle characteristics of the secondary battery improved.

EXAMPLES

The present invention will now be more specifically described with reference to Examples, but the scope of the present invention is not limited to the following examples.

In Examples and Comparative Examples, the following tetracarboxylic dianhydride, diamine, organic solvent, dispersant, and fine particles were used.

Tetracarboxylic dianhydride: pyromellitic dianhydride

Diamine: 4,4'-diaminodiphenylether

Organic solvent: N,N-dimethylacetamide

Dispersant: polyoxyethylene secondary alkyl ether dispersant

Fine Particles:

Silica (1): silica having an average particle diameter of 300 nm

Silica (2): silica having an average particle diameter of 700 nm

Example 1

[Preparation of Varnish]

(1) First Varnish

The tetracarboxylic dianhydride (6.5 g), the diamine (6.7 g), and the organic solvent (30 g) were put into a separable flask equipped with a stirrer, a stirring blade, a reflux condenser, and a nitrogen gas inlet tube.

Nitrogen was introduced into the flask through the nitrogen gas inlet tube to provide a nitrogen atmosphere in the flask. Subsequently, the tetracarboxylic dianhydride and the diamine were reacted at 50° C. for 20 hours by stirring the contents in the flask to prepare a polyamide acid solution. To the resulting polyamide acid solution was added 75 g of silica (1) as fine particles at a volume ratio between the polyamide acid and the fine particles of 22:78 (mass ratio: 15:85), followed by stirring to prepare a first varnish.

(2) Second Varnish

A second varnish at a volume ratio between the polyamide acid and the fine particles of 28:72 (mass ratio: 20:80) was prepared as in (1), except that 53 g of silica (2) as fine particles was added to the resulting polyamide acid solution.

[Formation of Polyimide-Fine Particle Composite Film]

The first varnish was applied onto a glass plate applied with a release agent with an applicator to form a film having a thickness of about 2 μm. Subsequently, a film of the second varnish was formed on the film of the first varnish with an applicator. Pre-baking at 70° C. for 5 minutes was performed to form an unburned composite film having a thickness of 25 μm.

The unburned composite film was peeled off from the substrate, and the release agent was then removed with ethanol. Thermal treatment was performed at 320° C. for 15 minutes to complete imidization.

[Formation of Porous Polyimide Film]

The polyimide-fine particle composite film was immersed in a 10% HF solution to remove the fine particles contained in the film. The surface on the side to which the first varnish was applied, which would be brought into contact with the negative electrode, was observed with an SEM. FIG. 1 shows the surface condition.

Comparative Example 1

A porous polyimide film was formed as in Example 1 except that the film was formed at once using only the second varnish of Example 1.

Comparative Example 2

A commercially available separator (Celgard 2000) was used.

Comparative Example 3

A porous polyimide film was formed as in Example 1 except that the film was formed at once using only the first varnish of Example 1. The resulting porous polyimide film was very fragile and had poor handleability.

Comparative Example 4

A porous polyimide film was formed as in Example 1 except that the film was formed at once using only the first varnish of Example 2 described below. Although it was better than that in Comparative Example 3, the resulting porous polyimide film was fragile and had poor handleability.

Production of Coin Battery for Evaluation

In a coin-shaped outer container made of stainless steel having a diameter of 20 mm, a carbon negative electrode, a separator cut into a circle having a diameter of 14 mm, metal lithium cut into a circle having a diameter of 14 mm, and copper foil cut into a circle having a diameter of 14 mm and a thickness of 200 μm as a spacer were stacked in this order; an electrolytic solution (1 mol·dm$^{-3}$ of LiPF$_6$: a solution mixture of ethylene carbonate/diethyl carbonate=1/1 (volume ratio)) was added to the container in several drops to such a degree that the solution does not overflow from the container; and the container was capped with a stainless steel cap via a polypropylene packing and was sealed with a caulking tool for coin batteries, to thereby produce a battery for evaluation of a negative electrode. In the production, the separator of Example 1 was used such that the surface on the side to which the first varnish was applied faced the negative electrode. Evaluation of charge-discharge characteristics of coin battery The charge-discharge characteristics were evaluated by charging each coin battery for evaluation at a current density of 2.2 mAh (1C) up to 4.1 V (CC-CV operation) and then discharging the battery at a current density of 2.2 mAh (1C), 3C, or 5C down to 2.5 V (CC operation), in a thermostatic chamber. Table 1 shows the results. In Table 1, the values shown in parentheses are the electrostatic capacity retention ratios (%) at a rate of 3C or 5C when the capacity at 1C is defined as 100%.

TABLE 1

| | Discharge capacity (mAh) | | |
|---|---|---|---|
| | 1 C | 3 C | 5 C |
| Example 1 | 2.15 | 1.61 (74.8%) | 1.28 (59.5%) |
| Comparative Example 1 | 2.05 | 1.41 (68.9%) | 0.95 (46.3%) |
| Comparative Example 2 | 2.08 | 1.32 (63.5%) | 0.64 (30.8%) |

Comparative Example 5

Figure 2:
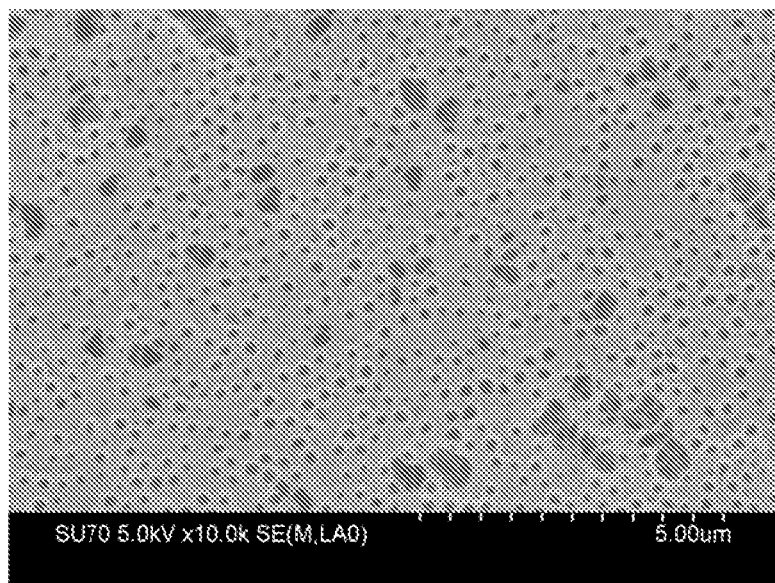
FIG. 2 is a photograph showing a surface of a porous polyimide film produced using a varnish containing fine particles at a volume fraction of 88%.

A porous polyimide film was formed as in Example 1 except that the volume ratio between the polyamide acid and the fine particles of the first varnish was adjusted to 18:82 (mass ratio: 12:88). The surface on the side to which the first varnish was applied, which would be brought into contact with the negative electrode, was observed with an SEM. FIG. 2 shows the surface condition in Comparative Example 5.

Example 2

Figure 3:
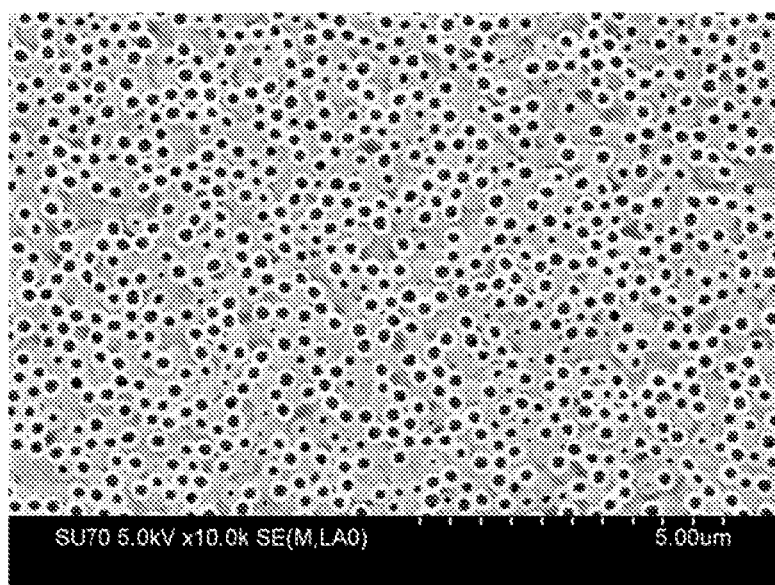
FIG. 3 is a photograph showing a surface of a porous polyimide film produced using a varnish containing fine particles at a volume fraction of 75%.

A porous polyimide film was formed as in Example 1 except that the volume ratio between the polyamide acid and the fine particles of the first varnish was adjusted to 34:66 (mass ratio: 25:75) and that the volume ratio between the polyamide acid and the fine particles of the second varnish was adjusted to 40:60 (mass ratio: 30:70). The surface on the side to which the first varnish was applied, which would be brought into contact with the negative electrode, was observed with an SEM. FIG. 3 shows the surface condition in Example 2.

It was demonstrated that a button battery according to Example 1 of the present invention shows a high capacity retention ratio at a high rate and has excellent electrical characteristics, compared to those of Comparative Examples. This is presumed to be caused by that a larger number of pores can be formed in the surface on the negative electrode side by forming two layers and to improve the Li ion mobility, compared to those in Comparative Examples.

Comparison of the surface conditions of Examples 1 and 2 to that of Comparative Example 4 demonstrates that when the volume ratio of the fine particles is 82, agglomerates started to be generated to form large holes. It was confirmed that although the volume ratio of the fine particles in the first varnish of Example 2 was smaller than that in Example 1, the pores were uniformly formed. Considering both that regular arrangement of uniform pores is recognized to be effective for improving the electrical characteristics of the battery (see Non-Patent Document 1) and that Example 1 gave the above-mentioned results, the use of the separator of the present invention produced using the first varnish containing the polyamide acid and the fine particles at a volume ratio of 19:81 to 45:65 probably can densely form pores having uniform sizes on the surface of the polyimide film and can improve the electrical characteristics of the lithium-ion battery.

Example 3

A porous polyimide was formed as in Example 1 except that the thickness of the film formed from the first varnish was about 1 μm and that the total thickness of the unburned composite film was about 20 μm.

Example 4

A porous polyimide was formed as in Example 3 except that the varnish was prepared by using the dispersant in an amount of 10 parts by weight based on 100 parts by weight of silica.

Comparative Example 6

A porous polyimide was formed as in Example 3 except that a monolayer precursor film having a thickness of about 20 μm was formed using only the first varnish of Example 1 as the unburned composite film. The average particle diameters on the front and rear surfaces of the porous polyimide were the same. The resulting porous polyimide was very fragile and had poor handleability.

Comparative Example 7

A porous polyimide was formed as in Comparative Example 6 except that the second varnish of Example 1 was used.

The film characteristics of the porous polyimide films prepared above were evaluated, and the results are summarized in Table 2.

[Air Permeability]

A porous polyimide film having a thickness of about 25 μm (in which the first unburned composite film occupies about 1 μm) was cut into a 5-cm square sample. The time for 100 mL of air passing through the sample was measured with a Gurley densometer (manufactured by Toyo Seiki Co., Ltd.) in accordance with JIS P 8117.

[Tensile Strength]

In order to evaluate the strength of a porous polyimide film, the tensile strength of the porous polyimide film was measured.

The porous polyimide films of Examples 3 and 4 and Comparative Examples 6 and 7 were each cut into a 1 cm×5 cm strip sample. The stress (MPa) at the time when this sample was broken was evaluated with RTC-1210A TENSILON (manufactured by ORIENTEC Co., Ltd.).

TABLE 2

| | Dispersant | Film thickness (μm) | Air permeability (sec) | Tensile stress (MPa) |
|---|---|---|---|---|
| Example 3 | Absent | 20 | 160 | ≥7 |
| Example 4 | Present | 20 | 65 | ≥7 |
| Comparative Example 6 | Absent | 20 | 160 | <1 |
| Comparative Example 7 | Absent | 20 | 16 | ≥7 |

The porous polyimide film of Comparative Example 6 having a single-layer structure showed low air permeability and also reduced strength of the film to make handling difficult. In the porous polyimide film of Comparative Example 7 similarly having a single-layer structure, although the film strength was improved to give a good handling property, the value of the air permeability was low.

In contrast, the porous polyimide films of Examples 3 and 4 designed so as to satisfy the requirements of the present invention had improved film strength to give excellent handling properties, while maintaining the air permeability. Comparison of the film of Example 3 not using a dispersant to the film of Example 4 using a dispersant demonstrates that the air permeability was slightly excellent in the film of Example 4 using a dispersant.

Production of Coin Battery for Evaluation

In coin outer container made of stainless steel and having a diameter of 20 mm, a carbon negative electrode, a separator of Example 3 or 4 or Comparative Example 6 or 7 cut into a circle having a diameter of 14 mm, metal lithium cut into a circle having a diameter of 14 mm, and a spacer of copper foil cut into a circle having a diameter of 14 mm and a thickness of 200 μm were stacked in this order; several drops of an electrolytic solution (1 mol·dm$^{-3}$ of LiPF$_6$: a solution mixture of ethylene carbonate/diethyl carbonate=1/1 (volume ratio)) were added to the container so as not to overflow from the container; and the container was capped with a stainless steel cap via polypropylene packing and was sealed with a caulking tool for producing coin batteries to produce a battery for evaluating a separator. On the occasion of the production, the separator was used such that the surface on the side to which the first varnish was applied faced the negative electrode. The resulting respective batteries were used as Examples B1 and B2 and Comparative Examples B1 and B2. Evaluation of charge-discharge characteristics of coin battery The charge-discharge characteristics were evaluated by charging each coin battery for evaluation at a current density of 2.2 mAh (1C) up to 4.1 V (CC-CV operation) and then discharging the battery at a current density of 2.2 mAh (1C) or 3C down to 2.5 V (CC operation), in a thermostatic chamber. Table 3 shows the results. In Table 1, the values shown in parentheses are the electrostatic capacity retention ratios (%) at a rate of 3C when the capacity at 1C is defined as 100%.

Production of Monolayer Laminate Cell Battery for Evaluation

A positive electrode of 20 mm×20 mm and a separator of 20 mm×20 mm of the respective above-described Examples were placed in an aluminum laminate outer container in this order, and an electrolytic solution (solvent: ethylene carbonate:ethyl methyl carbonate=3:7, electrolyte salt: LiPF$_6$ 1 mol/L) was added thereto. A negative electrode of 20 mm×20 mm was placed in the container, and the battery case was sealed to obtain lithium ion secondary batteries of Examples B1 and B2 as well as Comparative Examples B1 and B2. Here, the electrodes were a nickel-cobalt-manganese ternary positive electrode and an artificial graphite negative electrode, and were arranged such that the first layer was in contact with the negative electrode.

Furthermore, monolayer laminate cell batteries were prepared similarly to the above except that a commercially available polyethylene-based (PE-based) or cellulose-based separator was used. These batteries were used as Comparative Examples B3 and B4. The PE-based separator being used had a thickness of 20 μm, an air permeability of 270 seconds, and a porosity of 42%. The cellulose-based separator being used had a thickness of 25 μm, an air permeability of 135 seconds, and a porosity of 70%.

Charge-Discharge Characteristics of Monolayer Laminate Cell Battery

Using the resulting lithium ion secondary battery, the potential change by lithium occlusion was measured with a charge-discharge measuring apparatus. The battery was charged up to 4.2 V at a charging speed of 0.2C at 25° C., and after a pause of 10 minutes, was then discharged at a discharging speed of 2C down to a voltage range of 2.7 V. After the discharge, a pause of 10 minutes was taken. The battery was evaluated for the Ah utilization rate and Wh utilization rate (energy retention ratio) during this process.

Heat Resistance of Separator

The separator used in each battery was evaluated for the heat resistance using a soldering iron of about 250° C. according to the following criteria:

○: When a tip of the soldering iron is pressed against the center of a film, a mark was left, but the film was not broken.

x: When a tip of the soldering iron is pressed against the center of a film, the film was pierced.

Crushing Test of Monolayer Laminate Cell Battery

A crushing test was performed by charging a monolayer laminate cell battery at a voltage of 4.2 V and then compressing the battery in a resting state in the direction vertical to the length direction with a round bar having a diameter of 15.8 mm. The time when the voltage reduced was determined as the occurrence of internal short-circuit of the battery, and the battery was evaluated by the pressure at the time of the occurrence of the internal short-circuit. The amount of reduction in voltage at 5 seconds after the time of the reduction of the voltage was defined as ΔV (V). A higher value of the pressure is preferred, and a less reduction of the voltage is preferred.

TABLE 3

| | | Evalution results of coin battery | | Results of evaluation of monolayer laminate cell battery | | | Crushing test | |
|---|---|---|---|---|---|---|---|---|
| | | | | Ab utilization rate | Wh utilization rate | | | |
| | Separator used | 1 C (mAh) | 3 C (mAh) | (%) vs 0.2 C. | (%) vs 0.2 C. | Heat resistance | Pressure (ton) | Δ V (after 5 sec) |
| Example B1 | Example 3 | 2.1 | 1.6 (74.7%) | 88.0 | 84.2 | ○ | 0.56 | 0.26 |
| Example B2 | Example 4 | 2.2 | 1.7 (75.6%) | 88.1 | 84.3 | ○ | — | — |
| Comparative Example B1 | Comparative Example 6 | 2.0 | 1.4 (70.2%) | — | — | ○ | — | — |
| Comparative Example B2 | Comparative Example 7 | 2.1 | 1.4 (64.3%) | — | — | ○ | — | — |
| Comparative Example B3 | PE | — | — | 83.8 | 78.7 | x | — | — |
| Comparative Example B4 | Cellulose | — | — | 87.6 | 83.9 | ○ | 0.47 | 0.56 |

The results of evaluation of the coin batteries shown in Table 2 demonstrate that the use of the separator made of the porous polyimide film according to the present invention provides a higher capacity retention ratio than those of Comparative Examples 6 and 7. This is presumed to be caused by that a larger number of pores can be formed on the surface of the negative electrode side, while maintaining the handleability, by forming two layers to improve the Li ion mobility.

In addition, the results of evaluation of monolayer laminate cell batteries demonstrated that the use of the separator made of the porous polyimide film according to the present invention provides: a capacity retention ratio and heat resistance which are superior to those of the PE-based separator; the capacity retention ratio which is also equal or superior to that of the cellulose-based separator; and superiority in the crushing test.

The invention claimed is:

1. A method for producing an unburned composite film, the method comprising:
   a first unburned composite film-forming step of forming a first unburned composite film of a first varnish on a substrate, the first varnish containing a polyamide acid or polyimide (A1) and fine particles (B1) at a volume ratio (A1):(B1) of 19:81 to 45:65; and
   a second unburned composite film-forming step of forming a second unburned composite film of a second varnish on the first unburned composite film, the second varnish containing a polyamide acid or polyimide (A2) and fine particles (B2) at a volume ratio (A2):(B2) of 20:80 to 50:50 and having a fine particle content ratio lower than that of the first varnish.

2. A method for producing a polyimide-fine particle composite film, the method comprising a burning step of burning the unburned composite film produced by the method according to claim 1.

* * * * *